United States Patent [19]

Guzman

[11] 4,384,768
[45] May 24, 1983

[54] METHOD AND APPARATUS FOR MANIPULATING THE CONTRAST OF SINE WAVE GRATINGS AND OTHER VISUAL PATTERNS

[75] Inventor: Oscar Guzman, Toronto, Canada

[73] Assignees: Martin J. Steinbach, Toronto, Canada; New York University

[21] Appl. No.: 335,193

[22] Filed: Dec. 28, 1981

[51] Int. Cl.$^3$ .............................................. G03B 21/14
[52] U.S. Cl. ........................................ 353/20; 353/30; 353/38; 353/121; 351/30
[58] Field of Search .................... 353/20, 38, 121, 122, 353/30, 7; 351/30; 350/266, 431, 96.1, 96.24, 167

[56] References Cited

U.S. PATENT DOCUMENTS

| | | | |
|---|---|---|---|
| 3,498,705 | 7/1967 | Ooue et al. ............................ | 353/20 |
| 3,686,781 | 8/1972 | Calhoun, Jr. ........................ | 350/167 |
| 4,078,854 | 3/1978 | Yano .................................... | 353/7 X |
| 4,256,368 | 3/1981 | Task .................................... | 353/20 X |
| 4,299,451 | 11/1981 | Task et al. ......................... | 353/20 X |

FOREIGN PATENT DOCUMENTS 5230445  4/1975  Japan ................................. 350/431

OTHER PUBLICATIONS

Abrams, David, *Ophthalmic Optics and Refraction*, (London, Henry Kimpton, 1970), vol. 5, pp. 544–545.

*Primary Examiner*—Stephen Marcus
*Assistant Examiner*—William R. Sharp

[57] ABSTRACT

A method and apparatus for manipulating the contrast of sine wave gratings and other patterns is disclosed. The apparatus provides an improvement in a projection system for projecting light along an illuminating path to a viewing screen. The improvement is in a form an image forming system which can be manipulated to adjust the contrast between juxtaposed areas of the projected light distribution image. The apparatus comprises a source of substantially unpolarized light arranged to project along an illuminating path and image forming means and a contrast adjustment means. The image forming means has at least two discrete light transmitting zones disposed in the illuminating path to receive and transmit primary and secondary illuminating light beams respectively. The first zone has juxtaposed areas of sharply contrasting translucence whereby the primary illuminating light beam emanating from the first zone forms a primary image which has sharply contrasting image areas. The contrast adjustment means is disposed in the illuminating path for receiving the primary and secondary light illuminating beams and is adjustable to vary the ratio of the light intensity of the primary and secondary illuminating light beams transmitted therethrough to vary the contrast of the light distribution image. A Maddox rod is disposed in the illuminating path to receive the polarized light emanating from the contrast adjustment means to smear the image formed thereby prior to projection on to a viewing screen.

12 Claims, 8 Drawing Figures

METHOD AND APPARATUS FOR MANIPULATING THE CONTRAST OF SINE WAVE GRATINGS AND OTHER VISUAL PATTERNS

This invention relates to a method and apparatus for projecting and manipulating the contrast of light distribution while maintaining a substantially constant mean luminance in a projected image. The invention is particularly suited for use in projecting and manipulating the contrast of sine wave gratings and other light distributions.

A light distribution is the result of smearing an appropriate profile electronically, mechanically or optically. A Cathode ray tube is generally used in the generation and manipulating of the contrast of sine wave gratings and other light distributions. The small size of a cathode ray tube screen and its low luminance are serious limitations to the use of this equipment in studies of visual perception and clinical testing.

The present invention provides an improved projection system and a method of generating light distributions in which their contrast can be manipulated to be projected in proportions which are larger than those of a conventional cathode ray tube and employing an apparatus which is simple and inexpensive to maintain.

The contrast of sine wave gratings can be manipulated to achieve the contrast sensitivity function, in a clinic without requiring complicated electronics equipment. One can easily obtain a contrast sensitivity function in a clinic through the use of transparencies. The contrast sensitivity function (CSF) is obtained by presenting the patient with sine wave gratings and different frequencies and having the patient reduce the contrast of the grating until it is no longer visible. The patient's results are, then, plotted on a graph. Previously, the evaluation of this important function in a clinic has been hampered by the lack of a portable and, at the same time, accurate and apparatus.

According to one aspect of the present invention there is provided in a projection system for projecting light along an illuminating path to provide a light distribution on a viewing screen the improvement of a light distribution forming system which can be manipulated to adjust the contrast between juxtaposed areas of the projected image comprising a source of substantially unpolarized light arranged to project along an illuminating path; light distribution forming means having at least two discrete light transmitting zones disposed in said illuminating path to receive and transmit primary and secondary illuminating means, respectively, the first of said zones having juxtaposed areas of sharply contrasting translucence whereby the primary illuminating beam emanating from said first zone forms a primary image which has sharply contrasting image areas; contrast adjustment means in said illuminating path for receiving the primary and secondary light beams, said contrast adjustment means being adjustable to vary the ratio of primary and secondary illuminating light beams to vary the contrast of the light distribution image to vary the ratio of elements of the transparency.

The invention will be more clearly understood after reference to the following detailed specification read in conjunction with the drawings wherein.

Figure 1:
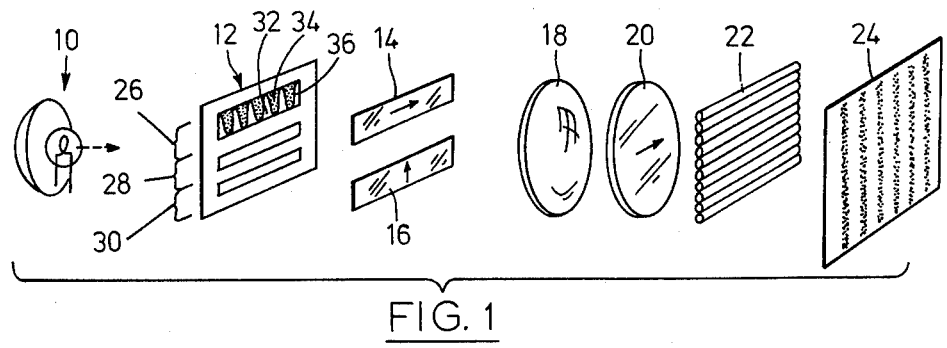
FIG. 1 is a diagrammatic illustration of a projection system constructed in accordance with the polarized embodiment of the present invention.

FIG. 1 of the drawings diagrammatically illustrates a projection system constructed in accordance with an embodiment of the present invention which comprises a light source 10, a transparency 12, a first polarized filter 14, a second polarized filter 16, a lens 18, a third polarized filter 20, a maddox rod 22 in a viewing screen 24.

The light source 10 may be any conventional source of substantially unpolarized light. The transparency 12 may be in the form of a photographic slide. The polarized filters 14 and 16 are of opposite polarity. The lens 18 is a lens of a conventional projection system and, as will be described hereinafter, it will be apparent that various different lens systems may be employed in order to project the required light through the essential elements of the projection system of the present invention. The third polarized filter 20 is mounted so as to be rotatable so that its polarity may be aligned with that of the first polarized filter 14 or the second polarized filter 18 or it may be positioned at any point between these alignments. The Maddox rod 22 is provided and arranged with the tubular elements aligned in the direction of the main axis of light transmitting zone 26. The Maddox rod assembly consists of one or several cylinders of red glass placed side-by-side in a frame. The Maddox rod serves to convert the image of a point-object into linear form. The screen 24 is of any conventional construction.

Figure 2:
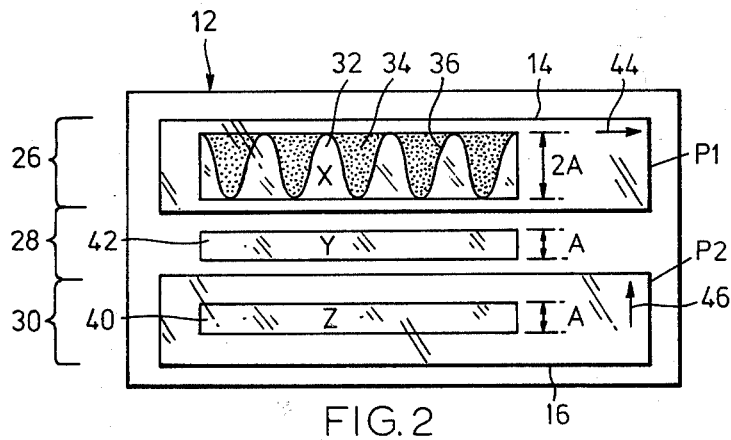
FIG. 2 is a diagrammatic illustration of the manner in which the first and second polarized filters are located with respect to zones of the transparency.

As shown in FIGS. 1 and 2 of the drawings, the transparency 12 is formed with three discrete light transmitting zones 26, 28 and 30. The zone 26 is the zone in which an image is formed. The image is formed by dividing the zone 26 into translucent areas 32 and opaque areas 34 along a sinusoidal dividing line 36. The light projected on to zone 26 will be transmitted through the translucent area 32 to form an image having light and dark areas corresponding to the translucent and opaque areas 32 and 34. A second translucent area 40 is provided in the zone 30 and a third translucent area 42 is provided in the zone 28. Area 32 must be equal in area to area 40.

The polarized filter 14 is placed in a position overlying the first zone 26 and the second polarized filter 16 is placed in a position overlying the zone 30.

In zone, light emanating from the unpolarized light source 10 is transmitted through the translucent areas 32, 40 and 42. The absolute polarity of polaroid 14 and 16 is not important as long as they are 90° with respect to each other. In the present invention arrows 44 and 46 can have other orientation but they must be at 90° with respect to each other.

In use, light emanating from a light source can pass through a translucent area 32 and translucent zones 40 and 42. The beam of light emanating from the first translucent area 32 is polarized by the first polarized filter and the light emanating from the second translucent area 40 is polarized by the second polarized filter 16. The light emanating from the translucent area 42 is unpolarized and is unaffacted by the rotation of the filter 20. When the light from area 42 is smeared and added to light distribution from areas 32 and 40, it acts a constant background illumination of the distribution. The purpose of translucent area 42 is to make the projected distribution brighter. Light emanating from the light transmitting zone 26 will, as previously indicated, be distributed to form a distinct pattern. This light is filtered by the first polarized filter 14 and is then transmitted through the lens 18 to the polarized filter 20. When the third polarized filter 20 is arranged as shown in FIG. 1 with its polarity matching that of the first polarized filter 14, all of the light emanating from the first translucent area 32 is transmitted to the Maddox rod together with the image formed by the opaque areas 34. The Maddox rod then smears the wave like image annd transmits it to the screen to provide a light distribution image in the form illustrated in FIG. 1 in which a series of vertically oriented dark bars are spaced by vertically oriented brightly illuminated bars. The white emanating from the light transmitting zone 30 is filtered by the polaroid filter 16 such that the light emanating from the polarized filter 16 is of opposite polarity to that emanating from a polarized filter 14. The light emanating from the polarized filter 16 is transmitted through the lens 18 to the polarized filter 20. When the polarized filter 20 is in the position shown in FIG. 1 with its polarity opposite of the polarized filter 16, substantially all of the light emanating from the polarized filter 16 is blocked by the polarized filter 20. It is by reason of the locking of the light emanating from the light transmitting zone 30 that the image appearing on the screen 24 has sharply contrasting areas.

Figure 3:
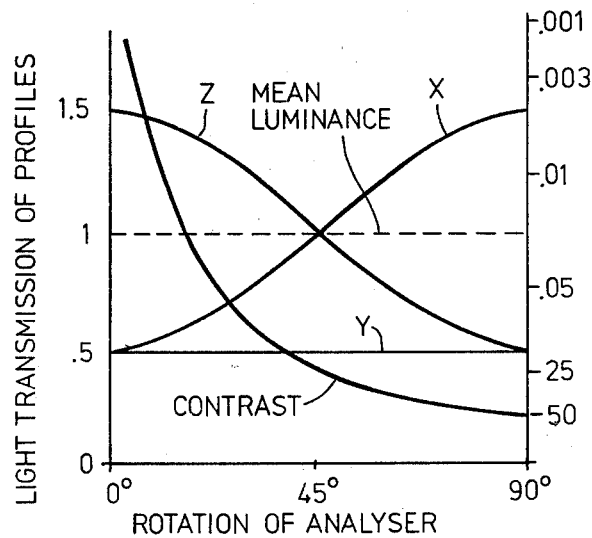
FIG. 3 is a graph illustrating the light transmission of the three clear areas in the transparency as a function of the rotation of the third polaroid. The changes in the contrast of the distribution are also shown as a function of the rotation of the third polaroid.

In order to adjust the contrast of the image appearing on the screen, the third polarized filter 20 is rotated with the result that its polarity changes with respect to that of the first and second polarized filters 14 and 16. As the polarity of the third filter begins to change with respect to the first filter 14, it begins to filter a portion of the light emanating therefrom and as it begins to change with respect to the polarity of the second filter 16, it begins to transmit a greater portion of light emanating therefrom. Thus, if the third filter 20 is rotated from a position shown in FIG. 1 through 90°, it will move from a position in which it reverses its polarity and progressively increases the amount of light which it transmits which emanates from the first polarized filter. Thus, the amount of light transmitted from the image forming zone 26, will decline and a contrast of the image appearing on the screen will diminish until it is entirely eliminated leaving a uniformly illuminated screen on which the mean luminance remains unchanged but since at this point the clear areas fully transmitting the mean luminance of display 24 remains unchanged (as shown in FIG. 3).

It should be noted that the polaroid 20 can be placed in different positions as in FIG. 1, it can be placed in front of the projector lens and behind the Maddox rod or it can be placed in front of the maddox rod or it can be placed behind the transparency in which case a heat reistant polaroid must be used or it can be placed in front of the observer's eyes in which case, the screen must retain the polarization.

Figure 4:
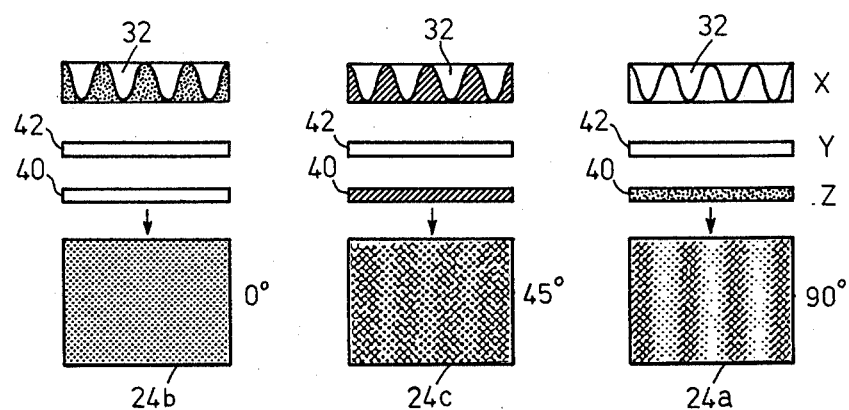
FIG. 4 is a diagram illustrating three viewing images resulting from three positions of the third polarized filter.

FIG. 4 of the drawings diagrammatically illustrates the effective adjusting the polarity of the third filter 20. In FIG. 4 a series of illustrations of the right hand side of the drawings serve to illustrate the conditions prevailing in FIG. 1 of the drawings wherein light emanating from the zone 32 and a zone 42 is transmitted to the screen wherein the light emanating from the zone 40 is blocked by the filter 16. This produces the image 24a which is substantially the same as that illustrated in FIG. 1 in which ther are adjacent bars of light and dark areas which are sharply defined. The series of illustrations shown at the left hand side of FIG. 4 illustrates the effect of rotating the third filter 20 through 90° to block the light emanating from the first zone 26 while permitting the light emanating from the second and third zones to be directed to the screen. The result is a screen as shown at 24b and which no contrast is discernible.

The central illustrations of FIG. 4 shown in intermediate position wherein the polarity of the third filter 20 is inclined 45° to that of the first and second filters 14 and 16 with the result that the light emanating from the zone 26 is partially blocked and the light emanating from the zone 30 is partially blocked with the result that the image appearing on the screen 24c is one in which there is a diminished contrast between the contrasting areas.

For the intermediate positions of polaroid 20, the changes of transmission of areas 36 and 40 follow the relation of $I = I \cos \theta^2$, where I is the intensity of the light coming from the lamp 28 and F is the rotation of the polaroid 20 in degrees. The transmission of these areas is shown in FIG. 3.

From the foregoing, it will be apparent that the degree of contrast of the image appearing on the screen may be varied over a very extensive image. The contrast which is achieved on a screen 24 is defined as $C = (L \max - L \min) \div (L \max + L \min)$ where L max and L min and the maximum and minimum luminances present in the display. In a light distribution generated by this method, L max is given by the addition by the light emanating from the zones 26, 28 and 30 and L min is given by the addition of light emanating from zones 28 and 30.

It should be noted that any kind of polaroid can be used, an HN-22 polaroid filter is recommended because its light transmission is close to 0 when it is at 90° with respect to another HN-22 filter. With other kinds of polarized filters, iit is important to take into consideration the light transmitted when they are at 90° with respect to each other.

Figure 5:
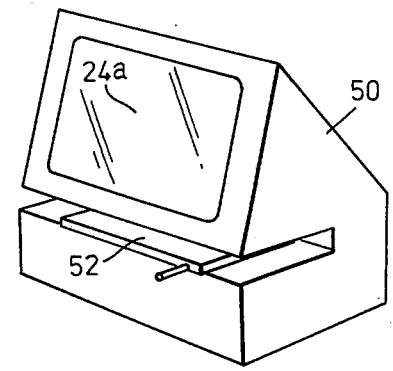
FIG. 5 is a diagrammatic illustration of a projector in which the projection system of the present invention may be incorporated.
Figure 6:
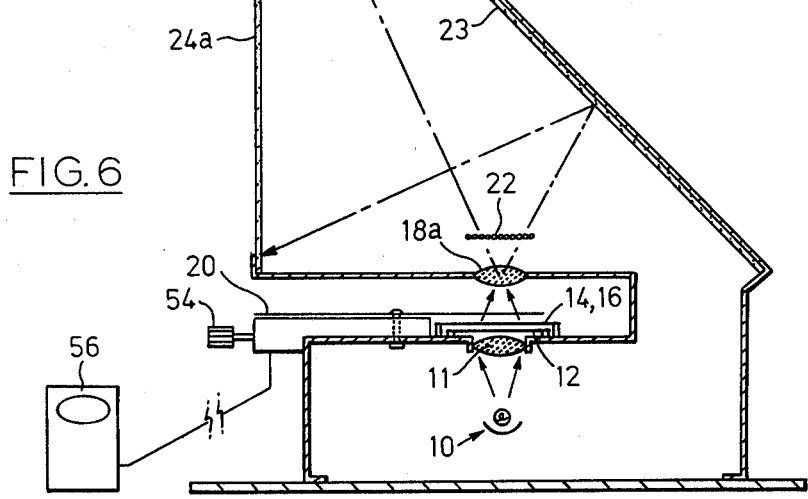
FIG. 6 is a diagrammatic side view of a projector of the type illustrated in FIG. 5 in which a projection system according to a further embodiment of the present invention is diagrammatically incorporated.

FIG. 5 of the drawings illustrates a projector housing of a type suitable for use in mounting a projection system constructed in accordance with the present invention. A projector housing system 15 may be similar construction to that of a microfiche reader in which a rear projection screen 24a is provided and in which a mounting platform 52 is provided. An alternative projection system is illustrated in FIG. 6 of the drawings wherein the light source 10 is directed through a columnating lens 11 on to the transparency 12 upon which first and second polarized filters 14 and 16 are mounted as previously described. When a set of several transparencies is used (e.g. when a CSF is obtained) it is convenient to attach the polarized filters 14 and 16 to the projector as illustrated in FIG. 6 to prevent variation in the polarity of transparent zones 32 and 40 from transparency to transparency. The third polarized filter 20 is mounted for rotation about a support shaft 21 and the light emanating from the third filter 20 passes through a lens 18a onto the Maddox rod 22 and is thereafter reflected by the mirror 24 onto the screen 24a. In order to adjust the polarity of the third filter 20 a control knob diagrammatically illustrated at 54 is rotatably driven. This drives the platform on which the filter 21 is mounted about the axis of the shaft 21. A shaft upon which the knob 54 is mounted may be connected to the platform through a reduction gear mechanism (not shown) so that the platform may be rotated slowly. The angular displace of the platform may be detected by the use of a potential meter and a position of the polarized filter 20 may be recorded by means of a recorder generally identified by the reference number 56 which receives a signal from the potential meter proportional to the angular displacement of the polarized filter about the shaft 21.

Figure 7:
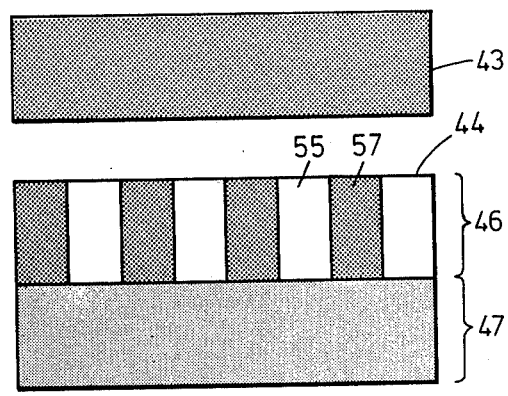
FIG. 7 is a diagrammatic illustration of the occluder and a transparency used in the occluder embodiment of the present invention.
Figure 8:
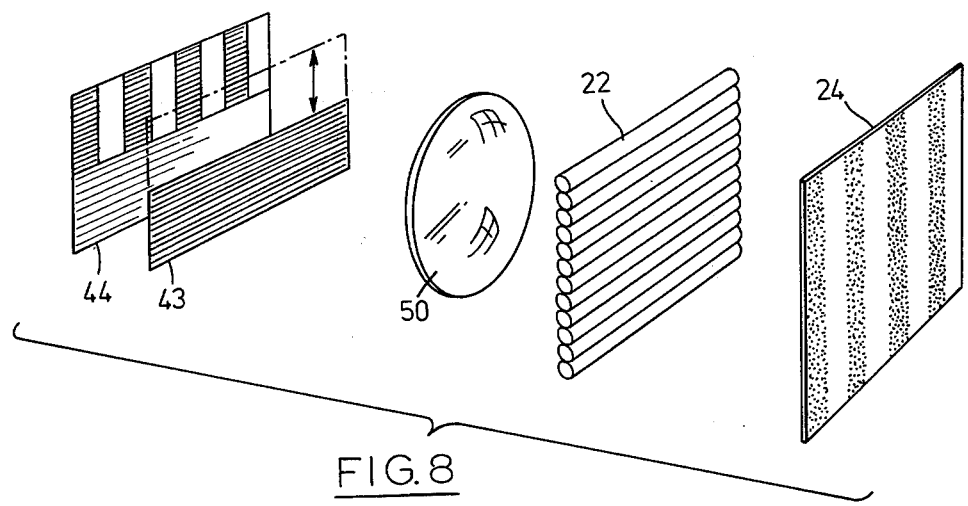
FIG. 8 is a diagrammatic illustration of a projection system constructed in accordance with the occluder embodiment of the present invention.

FIG. 7 of the drawings illustrates an occluder and transparency suitable for use in an occluder type projection system. A transparency 44 has a first light transmitting zone 46 which is divided into translucent areas 55 and opaque areas 57 arranged in a vertically oriented side-by-side relationship. The other half of the transparency 44 is in the form of an area 47 which has a neutral density translucence. The overall amount of light transmitted by the neutral area 47 is equal to the overall amount of light transmitted by the light distribution zone 46. This transparency is projected as shown in FIG. 8 in the usual manner but before the light reaches the projector lens 50 an occluder is placed in front of the transparency to selectively cover either the zone containing the light distribution or the zone containing the neutral density filter or any zone therebetween. The dimensions of the occluder are equal to those of the distribution zone 46 and those of neutral density area 47 and it can be seen that in any possible position of the occluder 43 the overall light transmitted by the transparency is constant. The lens 50 of the projector directs the light coming from these two zones of transparency 44 to a Maddox rod 22. The Maddox rod smears the light and in doing so it adds these two elements to project the variable contrast created thereby on the screen 24. The contrast of the screening will depend on the ratio of the elements of the transparency. The changes in contrast are linearly related to the position of the occluder.

Various modifications of the preferred embodiments described above will be apparent to those skilled in the art. For example, the contrast of complex gratings (e.g. square wave gratings, triangular gratings) and other distributions (Mach bands) can be manipulated in the same way. The alternative profile or distributor can take the place of the translucent area 32 (in zone 26) of FIG. 1 or area 44 in FIG. 7.

To reverse the contrast of sign wave gratings and other distributions, the profile distribution is placed in zone 26 and another is placed in zone 30 of the polarized arrangements. The shape of this profile in zone 30 is such that when added to the profile occupying zone 26 a uniform field is produced. No profiles are placed in zone 28. Polarized filters 14 and 16 are placed in front of each of these profiles. By rotating the analyzer 20, the light distribution varies from a "positive" distribution to a "negative" one. (In the case of gratings, from phase to counterphase) when the polaroid is at 45°, contrast is 0°.

These distributions can be moved if the slide containing the profiles is moved. This can be achieved by placing a loop with the profiles and the loop can be moved continuously by means of a variable speed driving mechanism. With moving gratings, it is possible to study the dynamics aspect of the CSF.

By placing different colour filters in front of the polarized profiles a distribution of one colour can be diluted in an unmodulated filed of another colour allowing for the measurement of simultaneous colour contrasts effects.

The various modifications of the present invention will be apparent to those skilled in the art without adding from the scope of the invention.

What I claim as my invention is:

1. In a projecting system for projecting light along an illuminating path to a viewing screen, the improvement of an image forming system which can be manipulated to adjust the contrast between juxtaposed areas of the projected light distribution image comprising:
   (a) a source of substantially unpolarized light arranged to project along an illuminating path,
   (b) image forming means having at least two discrete light transmitting zones disposed in said illuminating path to receive and transmit primary and secondary illuminating light beams respectively, the first of said zones having juxtaposed areas of sharply contrasting translucence whereby the primary illuminating light beam emanating from said first zone forms a primary image which has sharply contrasting image areas,
   (c) contrast adjustment means in said illuminating path for receiving the primary and secondary light illuminating beams, said contrast adjustment means being adjustable to vary the ratio of the light intensity of the primary and secondary illuminating light beams transmitted therethrough to vary the contrast of the light distribution image and,
   (d) a Maddox rod in said illuminating path arranged to receive the light emanating from the contrast adjustment means to smear the image formed thereby prior to projection onto said viewing screen.

2. A projection system as claimed in claim 1 wherein said contrast adjustment means comprises;
   (a) orthogonally polarized first and second polaroid filters disposed in said illuminating path, said first polaroid filter being aligned with said first zone and said second polaroid filter aligned with said second zone to transmit polarized light of opposite polarity from said first and second zones respectively, and
   (b) third polarized filter mounted in said illuminating path to receive the polarized light emanating from said first and second polarized filters, said third polarized filter being mounted for movement whereby its polarity may be varied with respect to that of said first and second filters to thereby selectively obscure the polarized light emanating from said first and second filters in inverse proportion to one another.

3. A projection system as claimed in claim 1 wherein said contrast adjustment means comprises;
  (a) occluder means disposed in said illuminating path for receiving light emanating from said image forming means, said occluder means being mounted for movement relative to said image forming means so as to occlude varying proportions of the light emanating from said first and secnd zones to adjust the contrast of the projected light distribution image as aforesaid, and
  (b) a lens disposed in said illuminating path between said occluder and said Maddox rod, said lens serving to direct the light emanating from said occluder to said Maddox rod.

4. A projection system as claimed in claim 2 wherein said image forming means has a third discrete light transmitting zone disposed in said illuminating path through which light is transmitted directly to said third polaroid filter to provide an illuminated background at the viewing screen in all positions of the third polarized filter.

5. A projection system as claimed in claims 2 or 4 further comprising a light collimating lens disposed in said illuminating path between said light source and said image forming means whereby light from the light source is substantially evenly distributed across the image forming means.

6. A projection system as claimed in claim 2 or 4 wherein the third polarized filter is mounted for rotation in a plane perpendicular to the illuminating path.

7. A projection system as claimed in claim 2, 3 or 4 wherein the juxtaposed areas of sharply contrasting translucence of the first zone are separated from one another along a sinusoidal wave form pattern extending along the length of the first zone.

8. A projectin system as claimed in claim 2, 3 or 4 wherein the juxtaposed areas of sharply contrasting translucence of the first zone are separated from one another along vertically oriented separation lines.

9. A projection system as claimed in claim 1, 2 or 3 wherein the image forming means is in the form of a photographic slide in which said juxtaposed areas of the first zone are respectively translucent and opaque and separated from one another along a sinusoidal boundary extending along the length of the first zone and the second zone is translucent and co-extensive with the first zone.

10. A projection system as claimed in claim 4 wherein the image forming means is in the form of a photographic slide in which said juxtaposed areas of the first zone are respectively translucent and opaque and separated from one another along a sinusoidal boundary extending along the length of the first zone and the second zone is translucent and co-extensive with the first zone, said third zone of said slide being uniformly translucent.

11. A projection system as claimed in claim 4 wherein the image forming means is in the form of a photographic slide in which said juxtaposed areas are respectively translucent and opaque and separated from one another along vertically oriented boundary lines, said second zone being translucent and co-extensive with said first zone, said third zone of said slide being uniformly translucent.

12. A method of manipulating the contrast of a projected image comprising the steps of;
  (a) projecting substantially unpolarized light along an illuminating path,
  (b) partially occluding the light passing along said illuminating path to provide at least two discrete light transmitting zones disposed in said illuminating path to receive and transmit primary and secondary illuminating light beams respectively, the first of said zones having juxtaposed areas of sharply contrasting translucence whereby the primary illuminating light beam emanating from said first zone forms a primary image which has sharply contrasting areas,
  (c) adjusting the ratio of the light intensity of the primary and secondary illuminating light beams to adjust the contrast of the illuminated image and smearing the contrast adjusted illuminated image by transmitting it through a Maddox rod disposed in the illuminating path and projecting the image as formed on to a viewing screen.

* * * * *

UNITED STATES PATENT OFFICE
CERTIFICATE OF CORRECTION

Patent No. 4,384,768   Dated May 24, 1983

Inventor(s) Oscar Guzman

It is certified that error appears in the above-identified patent and that said Letters Patent are hereby corrected as shown below:

Title page:

The name of the assignee should read --YORK UNIVERSITY, Downsview, Ontario, Canada.--.

Signed and Sealed this

Eleventh Day of December 1984

[SEAL]

Attest:

Attesting Officer

GERALD J. MOSSINGHOFF

Commissioner of Patents and Trademarks